June 9, 1964     R. H. CHRISTENSEN     3,136,154

FATIGUE MONITOR

Filed Nov. 20, 1958

INVENTOR.

Roy H. Christensen

BY Edwin Coates

ATTORNEY

3,136,154
FATIGUE MONITOR
Roy H. Christensen, Rolling Hills Estates, Calif., assignor to Douglas Aircraft Company, Inc., Santa Monica, Calif.
Filed Nov. 20, 1958, Ser. No. 775,305
2 Claims. (Cl. 73—88)

The present invention relates to a strain detector and more particularly to means for detecting and indicating the approach of failure of a structure or structural element subjected to varying loads.

It is well known that the strength of a structure or structural element subjected to varying loads progressively decreases under the influence of such loads by reason of some alteration in the internal structure of the material itself. This phenomenon is known as fatigue.

It is customary to test the fatigue strength of materials such as metals, or of structural elements or complete structures by subjecting individual test specimens or more complicated specimens, such as structural elements or complete structures to repeated or alternating loads in order to obtain test data setting out the effect of such repeated or alternating loads on the specimen. Such test data is usually plotted in the form of "endurance" curves which indicate the number of times a specified load cycle must be applied to produce failure of the specimen. It is customary for such curves to show the relation between the stress in the loaded system and the number of applications or reversals of the load.

Such fatigue tests are not wholly satisfactory for obtaining an estimate of the probable life of a structure or structural element for several reasons. The chief reason is that the load cycles in fatigue testing occur regularly, whereas in actual practice, the loads on a structure may fluctuate in an apparently indiscriminate manner which cannot be related to the regular load cycles used in ordinary fatigue tests.

Thus to overcome the difficulty of simulating under test conditions, the actual working loads on a structure or structural element, a variety of strain detector devices have been used. For desired operation the devices are placed on the structure or structural element in such a relationship that they will receive the same direct loading as the structure or structural element.

One such device presently used consists of a series of wires spaced a known distance apart and bonded to the structure or structural element. The wires are electrically connected to an indicator means, so that when any wires break as a result of fatigue cracking of the structure or structural element a break in the electrical signal will be produced. This system has proved impractical because it requires a considerable number of such bonded wires throughout the structure or structural element and a fairly accurate determination of the location to bond the wires. Also the wires do not usually fail until the structure or structural element to which they are bonded has started to fail.

Another device consists of a plurality of cantilever strips each having a different shape notch indentation at their root so as to provide different degrees of stress concentration. This device has proved unsatisfactory because of the undesirable properties of a cantilever beam when acted upon by a rapidly reversing force.

The present invention obviates the above mentioned problems by providing a simple and practical strain indicator in the form of a strip coupon containing a hole or notch to isolate its type and location of failure and of such a design as to work at a higher stress than the structure to which it is bonded.

In general, in its preferred form, the device embodies a symmetrically notched flat elongated strip of material which is fastened by appropriate means to a structure or structural element. The symmetrical notches are of such depth that a coupon of metal remains between the adjacent bases of the symmetrical notches. Said coupons are symmetrical about the longitudinal axis of the elongated strip and likewise co-axial of the transverse axis of the coupon is a means for increasing the strain produced in the cross sectional area of the coupon co-incident with the said transverse axis of the coupon. Said strain increasing means, called a stress raiser, is usually in the shape of an aperture extending through the elongated strip. A fine wire or series of wires can be bonded to the coupons encircling the stress raiser. As soon as a fatigue crack develops it can be detected visually, or when a fine wire has been bonded to the strip encircling the stress raiser the cracks will intersect and fail the wire and by electrical means a failure can be detected.

One application of the invention is to the detection of the approach of failure of a complex structure, such as an aircraft structure, subjected to reversals of stress from a random distribution of loading elements such as those which would arise from landing and encounters in flight with air gusts. A structural failure of the indicator will provide warning that the actual aircraft structure may also be approaching failure.

Other features and advantages of the present invention will be apparent from the following description. The presently preferred forms of the invention are illustrated in the accompanying drawings in which.

Figure 1:
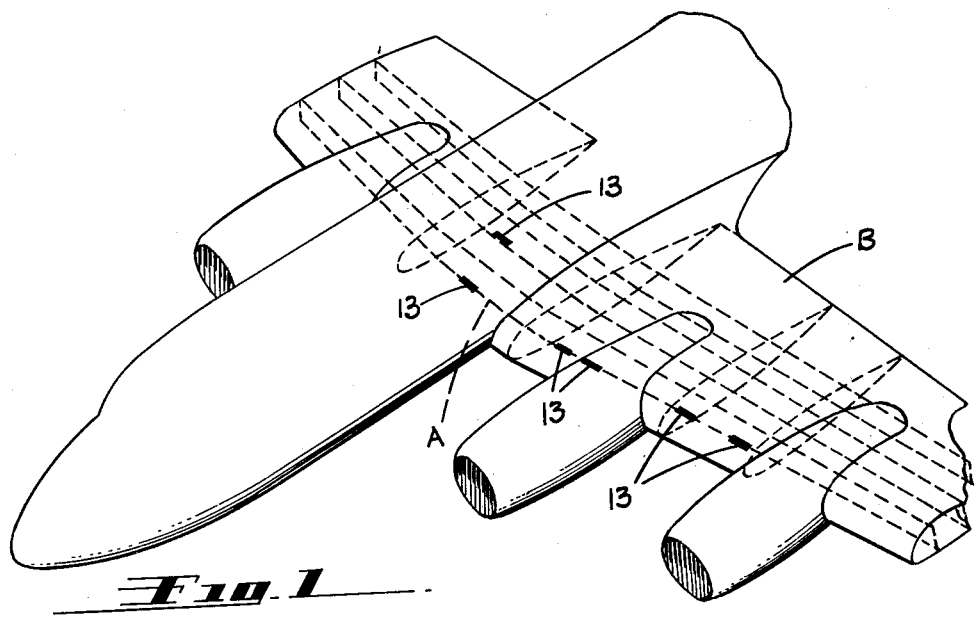
FIGURE 1 is a fragmentary perspective view of an airplane illustrating a typical installation of this invention.

The type of load evaluating for which the present invention is especially adapted but not limited is shown in FIGURE 1. Here the strain detector device has been installed along the center line A of the flange of the spar caps located in the wing section B of an airplane.

Figure 2:
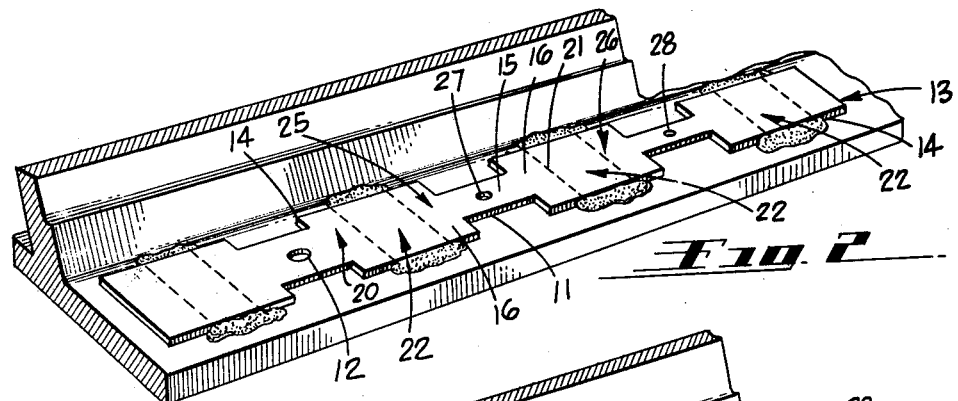
FIGURE 2 is a perspective view of the strain detecting device of the invention and a section of structure to which it is mounted.

Referring now to FIGURE 2, the strain indicator comprises a thin elongated strip of material or indicating zone 13 which is divided into coupons or free portions 20, 25, 26 of suitable material. A coupon 20 is the unfixed material that lies between adjacent points of fixation 22. At specific points along the long sides of the elongated strip 13, a plurality of symmetrical notch sections 11 have been removed from the strip 13 so that between the adjacent bases of the symmetrical notch sections 11 a coupon necked down portion or constricted portion 15 of material remains. Co-axial with the longitudinal axis of the elongated strip 13 and the transverse axis of the coupon necked down portions 15 are the stress raiser means or zones 12, 27, 28 such as a hole or notch for increasing the strain developed in the unit cross sectional area through the coupon necked down portions 15, coincident with the transverse axis thereof. Adjacent to the coupon necked down portions 15 are the larger shoulder ends 16 of the coupons 20, 25, 26. Located generally centrally of each enlarged portion of the strip is a mounting area or immobilized portion 22. An appropriate means is employed in the mounting areas 22 to rigidly mount the elongated strip 13 to the aircraft structure or structural element. This may be a cement of any suitable variety, one type being known in the trade as "EPON"–6, or rivets, bolts, etc. Cement is preferred as it avoids the necessity for making holes in the structure.

By properly designing the ratio of the cross sectional area of the coupon necked down sections 15 to that of the elongated strip 13 and the ratio of the length of the coupons 20, 25, 26 with that of the coupon necked down portions 15 and that of the larger shoulder ends 16, it is possible to magnify the strain developed in the unit cross sectional area through the stress raiser 12, 27, 28 perpendicular to the longitudinal axis of the elongated strip 13 to any desired degree when a force is applied to the structure or structural element to which the device is mounted.

Thus, by varying the aforementioned ratios as shown in FIG. 2 the magnification of strain developed across the coupons 20, 25, 26 contained in the strip 13 can be controlled so that the coupons 20, 25, 26 will fail at different times during the life of the device. The cross sectional area of the coupon necked down portions 15 through the stress raiser 27 perpendicular to the longitudinal axis of the elongated strip 13 is progressively smaller than the corresponding cross sectional area through stress raiser 12, and likewise the corresponding cross sectional area through stress raiser 28 is progressively smaller than that through stress raiser 27. To maintain this progression, the depth of the symmetrical notch sections 11 increase as the aforementioned cross sectional area decreases. Also the width of the stress raisers 12, 27, 28 decrease as the aforementioned cross sectional area decreases. Thus, because of the progression in the aforementioned cross sectional areas a progressively increasing magnification of the strain is developed in the respective coupon necked down portions 15. This progressively increasing magnification developed in the aforementioned cross sectional areas of strain developed in the aforementioned cross sectional areas will cause a failure of the respective coupons 20, 25, 26 at different times during the life of the device. This enables a progressive evaluation of the impending failure of the structural element or structure to which the device has been mounted. The above discussion is only typical of one way to vary the magnification of strain developed in the individual coupons so as to give a progressive failure evaluation. There are other ways of accomplishing a similar result, these would embody a similar discussion, but would be concerned with varying the length of the coupons 20, 25, 26 in relationship to the length of the coupon necked down portions 15, or in relationship with the length of the coupon necked down portions 15, or in relationship with the length of the larger shoulder ends 16. These methods are apparent from the above discussion and FIGURE 2, therefore they will not be discussed.

Figure 3:
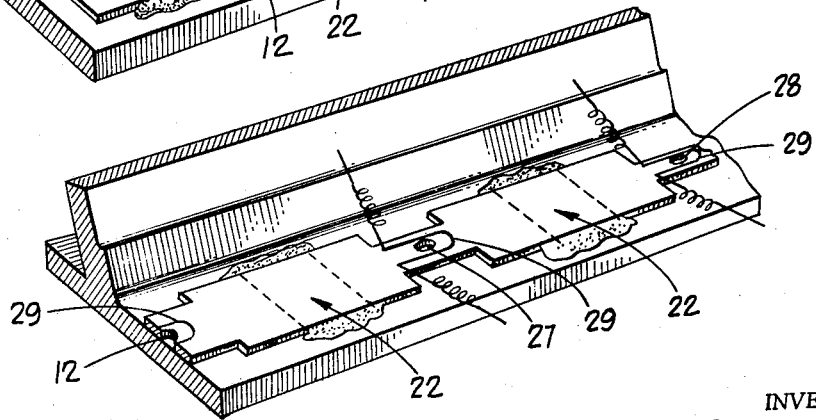
FIGURE 3 is a fragmentary perspective view of the strain detecting device of this invention with electrical detecting means attached.

Referring now to FIGURE 3, a small wire 29 is mounted to encircle the stress raisers 12, 27, 28. As soon as the smallest of fatigue cracks develop in the coupon they intersect and fail the wire and by electrical means connected to the wire these minute cracks can be detected.

FIGURE 1 illustrates a typical installation of the device to the structural elements of an aircraft. The device is mounted, by appropriate means, such as rivets, bolts, adhesive bonding agents or the like, to the structural element from which it is desired to obtain strain information. Such elements, to mention a few, could typically be the wing spar caps, horizontal and vertical stabilizer caps, flap hinge support brackets or the main and nose landing gear components. The coupons 20, 25, 26 are only mounted rigidly to the structural element in the mounting areas 22 and not in the shoulders and necked down portions because if the complete strip 13 were mounted rigidly to the structural element it would be uniformly strained with the structural element and no magnification of strain could be obtained. As the structure or structural element is subjected to varying load conditions, a magnification of the strain developed in the structure or structural element will be developed in the coupon necked down portion 15 of the device. As then varying loads continue, because of this magnification of strain, a failure of the device will result before the actual failure of the structure or structural element. Thus by either a visual inspection of the device or an electrically connected indicating means, the approaching failure of the structure or structural element can be noted. To set a standard against which the device can be evaluated, a like device is installed on an identical structure or structural element which is subjected to a static varying load. These test loads should closely approximate the loads which the actual structure or structural element would be subjected to. Therefore the life of the device and of the structure or structural element can be determined from the test. From this a comparison of the life ratios of the device used in the test to the device used in service will then be used to calculate the life or hours of operation before fatigue cracking of the structure or structural element will develop.

Although the now preferred embodiments and methods of the present invention have been illustrated and described it is to be understood that the invention need not be limited thereto for it is susceptible to change in form, detail and application within the scope of the appended claims.

I claim:

1. Means for monitoring fatigue of structural elements which are subjected to divers and various loads, including reversed loads, comprising: an elongate strip of material having a uniform thickness and including a plurality of strip-mounting areas and a plurality of longitudinally aligned, coupons each with a necked down portion, each one of said coupons being disposed between an adjacent pair of said areas, means for attaching the mounting areas of the strip to the element to be monitored; and each coupon having an aperture centrally thereof intermediate its end-portions for magnifying the stress developed in the coupon when the strip is in use; the ratio of the cross-sectional area of the necked-down portion of each coupon to that of the cross-sectional area of the adjacent full width portions of the strip varying in each coupon with relation to that of the other coupons, and the ratio of the length of each coupon to that of the coupon's necked-down portion varying in each coupon from end to end of said elongate strip, as to effect control of the stress-magnification in the respective coupons thereby to cause the respective coupons to successively fail at different times during the use-life of the element, whereby to afford a succession of fatigue-forewarning monitoring readings in the one elongate strip.

2. Means for monitoring fatigue of a structure or structural element which is subjected to divers and various loads, comprising: an elongate strip of material including a plurality of strip-mounting areas and a plurality of longitudinally aligned, necked-down coupons each one being disposed between a pair of said areas; means for attaching the mounting areas of the strip to the element to be monitored, the widths of the coupons varying from one end of the strip to the other, and each coupon including, medially of its ends and of its edges a circular aperture whose center lies at the intersection of the longitudinal center line of the coupon with the transverse center line of the coupon, thus lying substantially on the neutral axis of the strip and lying far inwardly from the edges of the necked-down coupon so as to be free of the errors that otherwise would be introduced by fiber stresses in the edges of the coupon, such fiber stresses including those stresses which arise from non-axial strains applied to the strip.

References Cited in the file of this patent

UNITED STATES PATENTS

| | | |
|---|---|---|
| 2,449,883 | De Forest | Sept. 21, 1948 |
| 2,724,964 | Singdale | Nov. 29, 1955 |
| 2,812,657 | Straub | Nov. 12, 1957 |
| 2,920,480 | Haas | Jan. 12, 1960 |

FOREIGN PATENTS

| | | |
|---|---|---|
| 716,572 | Great Britain | Oct. 6, 1954 |